United States Patent
Jessa et al.

(10) Patent No.: US 12,555,572 B2
(45) Date of Patent: Feb. 17, 2026

(54) METHOD AND SYSTEM OF AUTOMATIC CONTEXT-BOUND DOMAIN-SPECIFIC SPEECH RECOGNITION

(71) Applicant: Intel Corporation, Santa Clara, CA (US)

(72) Inventors: Szymon Jessa, Gdansk (PL); Jakub Nowicki, Gdansk (PL); Michal Papaj, Gdansk (PL); Piotr Hoffmann, Gdansk (PL); Krzysztof Swider, Gdansk (PL); Georg Stemmer, Munich (DE)

(73) Assignee: Intel Corporation, Santa Clara, CA (US)

(*) Notice: Subject to any disclaimer, the term of this patent is extended or adjusted under 35 U.S.C. 154(b) by 872 days.

(21) Appl. No.: 17/561,849

(22) Filed: Dec. 24, 2021

(65) Prior Publication Data

US 2022/0122596 A1    Apr. 21, 2022

(51) Int. Cl.
*G10L 15/197* (2013.01)
*G10L 15/06* (2013.01)

(52) U.S. Cl.
CPC .......... *G10L 15/197* (2013.01); *G10L 15/063* (2013.01)

(58) Field of Classification Search
CPC ..... G10L 15/197; G10L 15/063; G10L 15/02; G10L 15/144; G10L 15/148; G10L 15/16; G10L 15/26; G10L 25/30; G10L 25/51; G10L 2015/025; G10L 2015/0631
See application file for complete search history.

(56) References Cited

U.S. PATENT DOCUMENTS

| | | | |
|---|---|---|---|
| 11,756,541 B1* | 9/2023 | Mrani | G06F 16/48 704/257 |
| 2009/0326923 A1* | 12/2009 | Yan | G06F 40/30 704/10 |
| 2011/0060587 A1* | 3/2011 | Phillips | G10L 15/30 704/235 |
| 2014/0288970 A1* | 9/2014 | Lee | G16H 30/40 705/2 |
| 2015/0186362 A1* | 7/2015 | Li | G06F 40/53 704/3 |
| 2020/0051552 A1* | 2/2020 | Kothuvatiparambil | G10L 15/30 |
| 2020/0327285 A1* | 10/2020 | Cox | G06F 16/90348 |
| 2021/0158804 A1* | 5/2021 | Tiwari | G10L 15/183 |
| 2022/0284884 A1* | 9/2022 | Tongya | A63F 13/67 |
| 2022/0309140 A1* | 9/2022 | Chae | H04L 9/3231 |
| 2022/0382973 A1* | 12/2022 | Levit | G06F 40/226 |

* cited by examiner

*Primary Examiner* — Michael Colucci
(74) *Attorney, Agent, or Firm* — Akona IP PC

(57) ABSTRACT

A system, article, and method of automatic context-bound domain-specific speech recognition uses general language models.

25 Claims, 9 Drawing Sheets

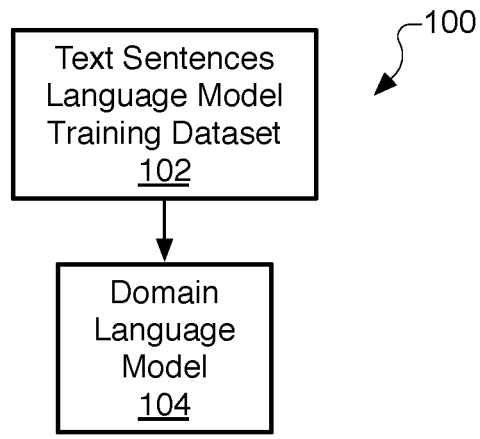
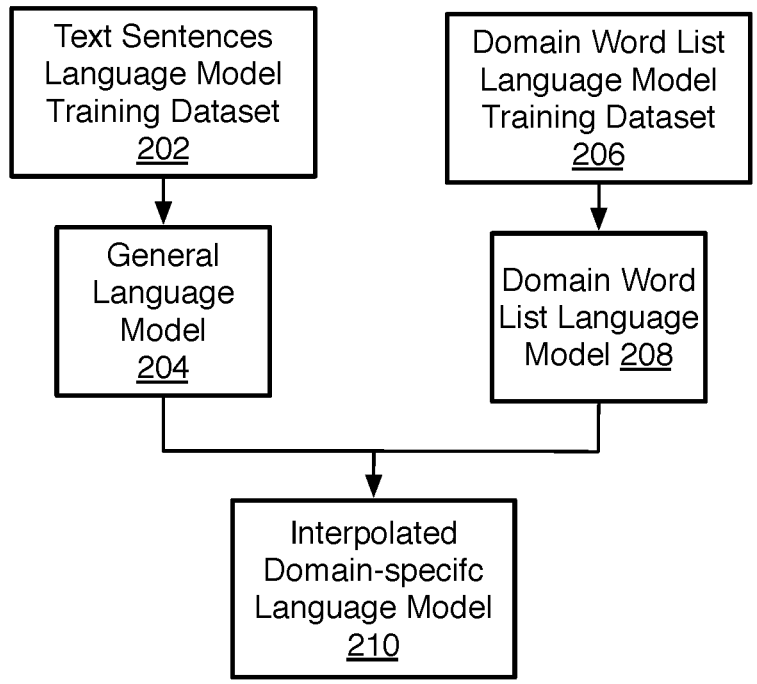

METHOD AND SYSTEM OF AUTOMATIC CONTEXT-BOUND DOMAIN-SPECIFIC SPEECH RECOGNITION

BACKGROUND

Automatic speech recognition (ASR) systems have become increasingly important as more computer-based devices use speech recognition to receive commands from a user in order to perform some action as well as to convert speech into text for dictation applications or hold video conferences where information is exchanged in one or both directions. ASR also can be used for automatic toxic speech detection where statistical language models can detect offensive, inappropriate, vulgar, insulting, or hurtful speech. This may be desired with online gaming environments to avoid such toxic speech being heard by children. The toxic speech detection may be used to subsequently blank or bleep out offending speech so that the toxic words are not audible to listening people. Otherwise, such as a system can warn offending users on a gaming platform to change their behavior, or terminate the offending user's access to the platform. The toxic speech detection also could be used by social video or audio websites to monitor videos or audio uploaded to their platforms. Conventional domain-specific ASR language models that perform these tasks, however, are often highly inaccurate.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram showing a conventional domain statistical language model;

FIG. 2 is a schematic diagram showing another conventional domain statistical language model;

DETAILED DESCRIPTION

Figure 3:
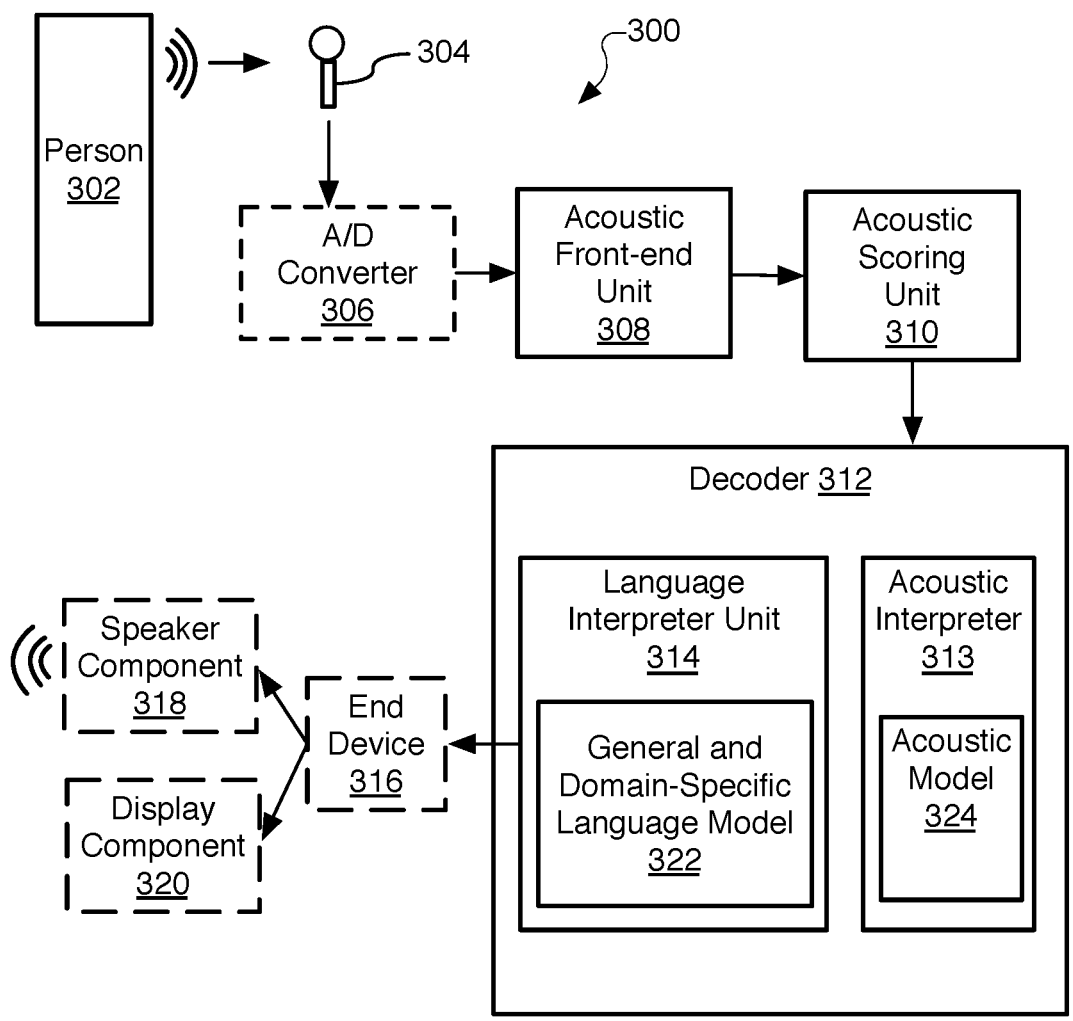
FIG. 3 is a schematic diagram showing an audio processing system to perform automatic context-bound domain-specific speech recognition according to at least one of the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, commercial devices, and/or consumer electronic (CE) devices such as servers, laptop or desktop computers, mobile devices such as smart phones, smart headsets or headphones, video game panels or consoles, hand-held gaming display devices, gaming controllers, virtual, augmented, or merged reality headsets, televisions, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatic context-bound domain-specific speech detection is described herein.

Automatic speech recognition (ASR) applications can recognize speech, which then can be searched in order to identify words, phrases, and sentences in the speech. The ASR uses an acoustic model to provide probabilities of phonemes in processed audio. The ASR system then uses a language interpreter with a language model to provide probabilities of word sequences, such as sentences or phrases. Then a decoder (or transformer) is used to combine those two inputs together to produce a ranked list of hypotheses, where the first hypothesis on the list is usually used for further processing. These combined components of the ASR effectively can recognize speech, in the form of probabilities, based on perceived sound and language statistics. The language model may be sufficiently sophisticated to understand context, grammar rules, and so forth, so that the language model can even distinguish words among homophones, e.g., words that sound the same and have different definitions such as "to", "too", and "two". While the term "language model" can have a number of different meanings including reference to the entire ASR system itself, a language model used herein will generally refer to the language model, or version (or state) of the language model, being used by the language interpreter at the decoder and that receives sentence probabilities from an acoustic interpreter model at the decoder, and outputs a most likely word, phrase, or sentence to be used by the decoder to generate the ranked list of sentences (or phrases or hypotheses).

As mentioned, a decoder with a language model may be trained to specifically identify, or more accurately recognize, specific domain vocabularies. This may include toxic word detection where the toxic domain-specific ASR system can recognize and even specifically indicate presence of an offending word in a sentence of captured audio. At times, the domain may include words or phrases that require additional modules beyond context analysis performed by the decoder using the language model, such as the acoustic environment, and/or the tone (or emotion or inflection) of the speaker in order to determine if the audio contained domain words. Specifically, with a toxic domain context, and depending on what was spoken, the situation can be very different depending on the exact words used in the context in the audio, and the environment which relates to whether the audio is spoken within an online game, with family or friends, or on a business conference call for example. In many instances, however, the presence of the toxic words themselves, such as swear words, is all that is needed to take an action or make a decision in response, in contrast to other domains that rely more heavily on sentence context. When the toxic domain triggers can occur more often simply based on the presence of the words themselves, this make the system much more accurate when accurate word recognition can be provided. High accuracy, however, still is sorely lacking with domain-specific ASR.

Referring to FIG. 1, an audio processing system 100 has a conventional domain-specific statistical language model (or just domain language model) 104 used in ASR and that is trained (or estimated) directly from a training dataset 102 with training text or word sentences that have the targeted domain words. This may be referred to herein as the baseline language model. The accuracy of such model depends mostly on the amount of data and how accurately the data represents the application domain. Such language models require a large amount of training sentences. However, it is difficult and costly to obtain large amounts of training data for many domains including toxic language domains. For many use cases, such as toxic domains, the datasets simply do not exist and will need to be created. Also, these training models are usually only trained on data that includes the domain words or phrases so that the large amount of out-of-domain language cannot be leveraged to reduce false positives, and in turn accuracy, for language that has not been experienced before by the language model, and therefore reduces the value of the language model.

Referring to FIG. 2, other conventional audio processing systems 200 train a general (or generic) language model 204 with a text sentences language model training dataset (or general dataset) 202 that may or may not include domain words, and while separately training a domain word list language model (domain word list model) 208 with a domain word (0-gram) list language model training dataset 206. The general dataset 204 and the domain word list model 208 are then interpolated to combine the models and form an interpolated domain-specific language model 210. This conventional method biases the general language model towards the target domain vocabulary. However, since the model is interpolated with words without their occurrence frequency and word-level context, little information is gained in the final language model. Specifically, familiar context of a domain word as well as a sufficient number of different samples assists to recognize the toxic language. Without it, this reduces the language model prediction accuracy.

To resolve these issues, the disclosed system and method train a context-aware domain-specific (or just domain) statistical language model, which also may be referred to herein as a general and domain-specific language model. The system herein uses smart context injections into the statistical language model to emphasize the selected phrases in proper context. The model uses a domain phrase or words list to filter out word sequences available from a training general dataset of a first general language model so that no additional training data is required. A second domain-specific language model is estimated from the filtered-out sequences and then interpolated with the general language model. Just for clarity, filtering out entire general words or phrases for use in a domain dataset will be referred to as filtering rather than generating n-grams as described herein.

In detail, the training may be accomplished by selecting context information from only those sentences or phrases form the general dataset that include a domain word or phrase, where the domain may be toxic language. This general-aware information then may be added to the domain dataset in a number of different ways. By one approach, the entire general sentence or general phrase with domain phrases or words is added to the domain dataset. By another approach, each detected domain word in a general sentence or phrase from the general dataset is used to form multiple n-grams where the domain word is in a different location in each of the multiple n-grams. The generation of the multiple n-grams may be repeated for each domain word found in the general dataset. The n-grams are then added to the domain dataset. This second approach with n-grams is used because it minimizes the amount of redundant irrelevant information added. In the first approach, n-grams that are distant from the relevant toxic word in a sentence are added which do not provide relevant information. By limiting the scope, error is minimized that otherwise could be introduced into the new language model.

An n-gram (or Q-gram) is a contiguous sequence of n items from a given sample of text or speech. The items for n-grams herein are words or those language units that would be usually separated by spaces in a sentience of written text or a pause in audio. Compound words or hyphenated words may count as either a single word or multiple words. For n-grams herein, parts of language such as phoneme, syllables, and letters of words would not normally be counted unless they are being singled out for a specific reason, or there is sentence spacing emphasizing such part of speech such as an imitation of a person's stutter for example, "st, st, stupid". The n-grams typically are collected from a text or speech corpus.

This domain language model arrangement raises recall (the ratio of positive domain detections versus all detections) and lowers latency to detect domain words and phrases using automatic speech recognition in continuous speech. Higher recall is useful because false detections are less costly than false rejections. While particularly useful for toxic domains, the present method and system also can be used for increasing recognition accuracy of other domains such as named entities, names, key words, and others.

Referring now to FIG. 3, an audio processing system or device 300 for automatic context-aware domain-specific speech detection may be a speech enabled human machine interface (HMI), and may have an audio capture or receiving device 304, such as a microphone for example. The microphone 304 may receive sound waves from a user 302 and convert the waves into a raw electrical acoustical signal that may be recorded in a memory. Such microphone 304 may be local on a smartphone providing the audio processing, or may be remote from the physical device 300 providing the audio processing. The system 300 may have an analog/digital (A/D) converter 306 to provide a digital acoustic signal to an acoustic front-end unit 308.

The acoustic front-end unit 308 may perform pre-processing which may include noise cancelling, pre-emphasis filtration to flatten the signal, and/or voice activation detection (VAD) to identify the endpoints of utterances as well as linear prediction, mel-cepstrum, and/or additives such as energy measures, and delta and acceleration coefficients, and other processing operations such as weight functions, feature vector stacking and transformations, dimensionality reduction and normalization. The front-end unit 308 also may divide the acoustic signal into frames, by 10 ms frames by one example, and extracts acoustic features or feature vectors from the acoustic signal using fourier transforms and so forth to identify phonemes provided in the signal.

An acoustic scoring unit 310 then determines a probability score for the context dependent phonemes that are to be identified. By one approach, the acoustic model 324 may be similar to a Markov chain or model used for the decoding and/or language interpretation herein, and may be deep neural network hidden Markov models (DNN-HMMs). A three-fold reduced frame rate may be used at the output of the acoustic scoring DNN. The input features of the DNN may have an original frame rate of 100 frames per second. The DNNs used may have recurrent connections or internal splicing such that the DNNs are not purely feedforward DNNs. Otherwise, the acoustic scoring unit may use or be a gaussian mixture model (GMM), other DNN, or other acoustic models that perform the same tasks.

A decoder 312 may have an acoustic interpreter unit 313 and a language interpreter unit 314. The acoustic interpreter unit 313 may have an acoustic model 324 in the form of a weighted finite state transducer (WFST) that uses the acoustic scores to identify utterance or sentence hypotheses. A hypothetical word sequence or word lattice may be formed by the WFST to form the utterance hypotheses by utilizing a token passing algorithm on a Markov model or chain. The word lattices may provide confidence measures and/or alternative results. The Markov chain or model of the WFST uses calculations that may be represented as a network of arcs and states with weights. The WFST may be a deterministic or a non-deterministic finite state transducer. Many different forms of the WFST can be used where the WFST may be statically or dynamically composed from a lexicon WFST (L), a language model or a grammar WFST (G), a context sensitivity WFST (C), an HMM WFST (H) that may have HMM transitions, HMM state IDs, GMM densities or DNN output state IDs as input symbols. The WFST may or may not be determinized, minimized, weight or label pushed or otherwise transformed (e. g. by sorting the arcs by weight, input or output symbol) in any order before being used for decoding. Also the WFST may perform the decoding with weights supplied by the language models.

The identification and probabilities of word sequences and/or word lattices output from the acoustic interpreter 313 may be provided to the language interpreter unit 314. The language interpreter unit 314 cooperatively with the acoustic interpreter 313 determines a list of sentences that may have domain words in the sentences. This list is the output of the decoder 312. The language interpreter unit 314 may operate a trained general and context-aware domain-specific language model 322 that is trained by using the methods herein. The details of the language model 322 are provided with language model 400 (FIG. 4) described below. The outputs of the general and context-aware domain-specific language model 322 are probabilities of the word sequences (or sentences).

One the list is generated, the language interpreter unit 314 itself or another unit such as the end device 316 may search the list for the most likely sentence from the audio and may provide a response or initiate an action. The response may be in audio form through a speaker component 318, or in visual form as text on a display component 320 for example. Otherwise, an action from the language interpreter 314 may initiate or control another end device 316 (whether or not considered as part of, or within, the same device as the speech recognition system 300). For example, a user may state "call home" to activate a phone call on a telephonic device, the user may start a vehicle by stating words into a vehicle fob, or a voice mode on a smart phone may perform certain tasks on the smart phone.

Specifically regarding toxic domain detection, the end device 316 may be an application to bleep or blank out a swear word on audio being generated for emission at the speaker 318, or may be a gaming application that warns a user or shuts off a user's access to the game. The end device 316 may simply be software instead of a physical device or hardware or any combination thereof, and is not particularly limited to anything except to have the ability to understand a command or request resulting from a speech recognition determination and to perform or initiate an action in light of that command or request.

The acoustic scoring unit 310, decoder 312, and other units of the audio processing system 300 may use known specific rules, construction, operation, and properties for single-best speech decoding, and the details of these that are not relevant here are not explained further in order to provide a clear description of the arrangement of the new features described herein.

Figure 4:
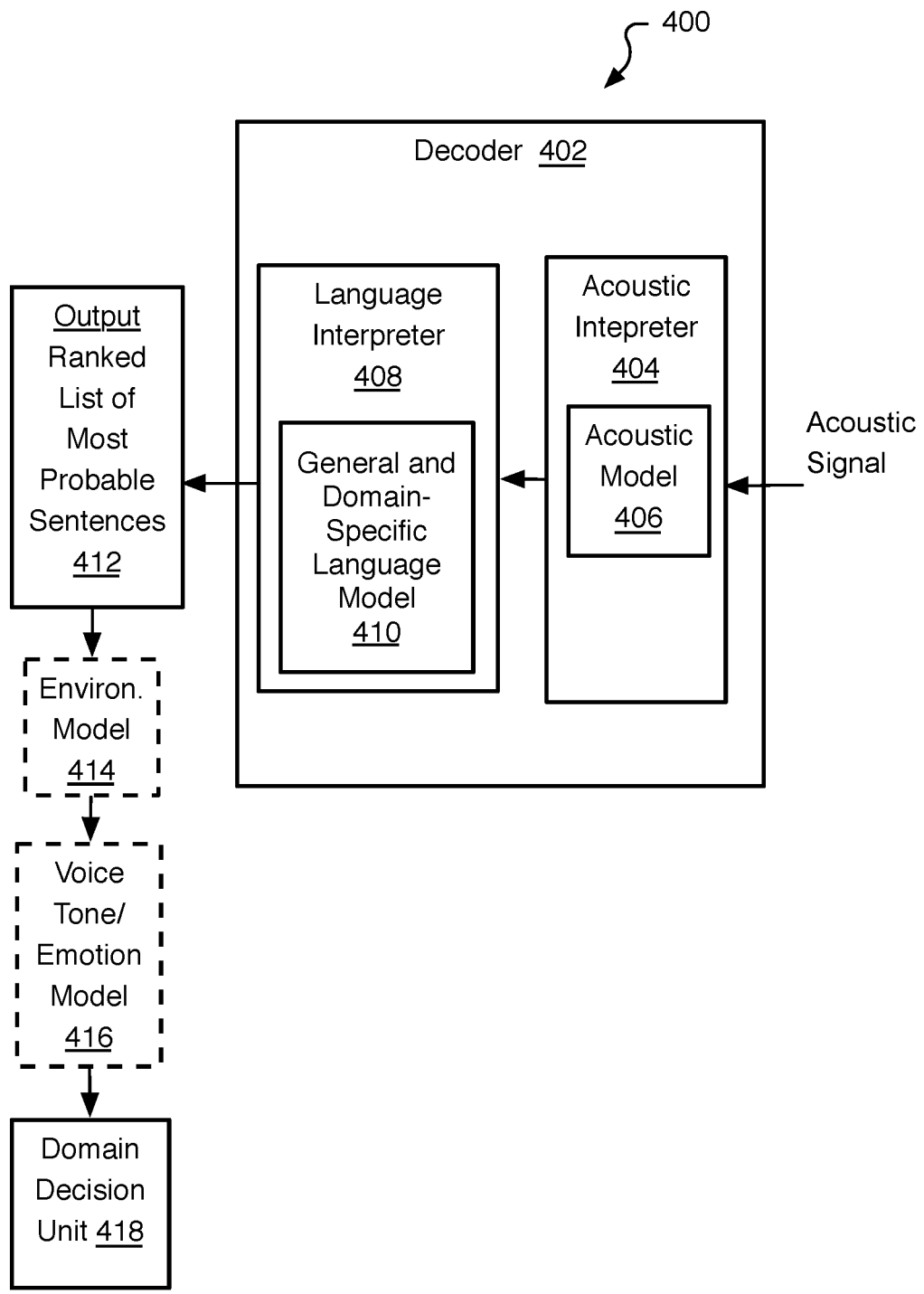
FIG. 4 is a schematic diagram showing a decoder with a language model for automatic context-bound domain-specific speech recognition according to at least one of the implementations herein.

Referring to FIG. 4, a domain specific ASR system 400 uses a context-aware domain-specific language model (or general domain-specific language model) 410, similar to the language model 322, to detect domain language and may be trained using the methods and systems herein. Specifically, the language model 400 may have a decoder 402 with an acoustic interpreter unit 404 that uses an acoustic model 406 as described above with acoustic interpreter unit 313. The decoder 402 also may have a language interpreter 408 that uses the general domain-specific language model 410.

The acoustic interpreter 404 may use the WFST and Viterbi algorithms to eliminate the least promising sentences, and then generate a word lattice or word sequence or sentence hypotheses with probabilities, or in other words, a list of acoustic probabilities of individual sentences, and as mentioned with acoustic interpreter 313 (FIG. 3). These acoustic probabilities are provided to the language interpreter 408.

The language interpreter 408 uses the language model 410 model to generate a priory probability of the sentences received from the acoustic interpreter unit 404, and particularly to generate weights supplied to the WFST by the language model. The language model 410 may be in the form of a Markov model which has chains of weighted states and arcs. By one form, the Markov model may be a hidden Markov model and long short-term memory (HMM-LSTM) chain in a Kaldi system. In contrast to other systems that use a frame-level objective, the objective function used to train a Kaldi chain uses log-probability of the correct phone sequences as the objective function. Thus, the present Markov Model may be an Advanced Research Project Agency (ARPA) language model. When a neural network is being used, it may have one or more activation function layers, such as tanh and SoftMax layers. The output 410 from the decoder 404 may be a ranked list of sentences (or phrases) that can be searched for the domain word(s).

For the domain language detection, below is an example n-gram language model that can be used as language model 410 and is expressed in ARPA format (also see https://cmusphinx.github.io/wiki/arpaformat) that may be used with the present methods and systems:

```
\data\
n-gram 1=7
n-gram 2=7
\1-grams:
-1.0000 <unk> -0.2553
-98.9366 <s> -0.3064
-1.0000 </s> 0.0000
-0.6990 wood -0.2553
-0.6990 cindy -0.2553
-0.6990 pittsburgh -0.2553
-0.6990 jean -0.1973
\2-grams:
-0.2553 <unk> wood
-0.2553 <s> <unk>
-0.2553 wood pittsburgh
-0.2553 cindy jean
```

-continued

```
-0.2553 pittsburgh cindy
-0.5563 jean </s>
-0.5563 jean wood
\end\
```

In this format, the first section \data\ denotes the order of the n-grams and how many of each order are present. Then, sections are provided for each order of n-gram where a first column is the probability of the sequence P(w) for 1-grams, P(Wi|Wi−1) for 2-grams, P(Wi|Wi−1, Wi−2) for 3-grams, and so forth. The second column is the sequence as expressed in text form, and the third column is the back-off value, which is a "fallback" value estimated in case of an unseen or unexperienced sequence. Herein, a lower order n-gram is to get the full probability P(Wi|Wi−1, Wi−2).

Also, the language model may have or include other context or intent detection units such as a context lexicon, which may or may not be considered part of the language model, and a grammar model.

Once the user intent is determined, the language interpreter unit 408 determines and outputs the ranked list 412 of the most likely sentences with domain words or phrases, where the first hypothesis on the list is usually used for further processing. A search may be performed to determine if the sentences have domain language. Then, the list with those sentences with domain words or language may be provided to post recognition models such as an environment model unit 414, a voice tone/emotion model unit 416, and a domain decision unit 418 to perform an action. For toxic domains, and whether or not a swear word is present in a phrase, the environment model unit 414 may determine whether the language is appropriate or not. In a business environment, it may not be appropriate but at a personal residence, it may be acceptable, and this may be true even when a swear word is present. If not indicated as a domain word purely based on the environment, then the phrase may be passed to the voice tone model unit 416 to determine if the speaker's emotions or voice inflection makes a difference to the domain detection determination. The phrase is then passed to the domain decision unit 418 to make a final decision and initiate an appropriate action. Conventional post-recognition models may be used, and the details of these models need not be provided here.

Figure 5:
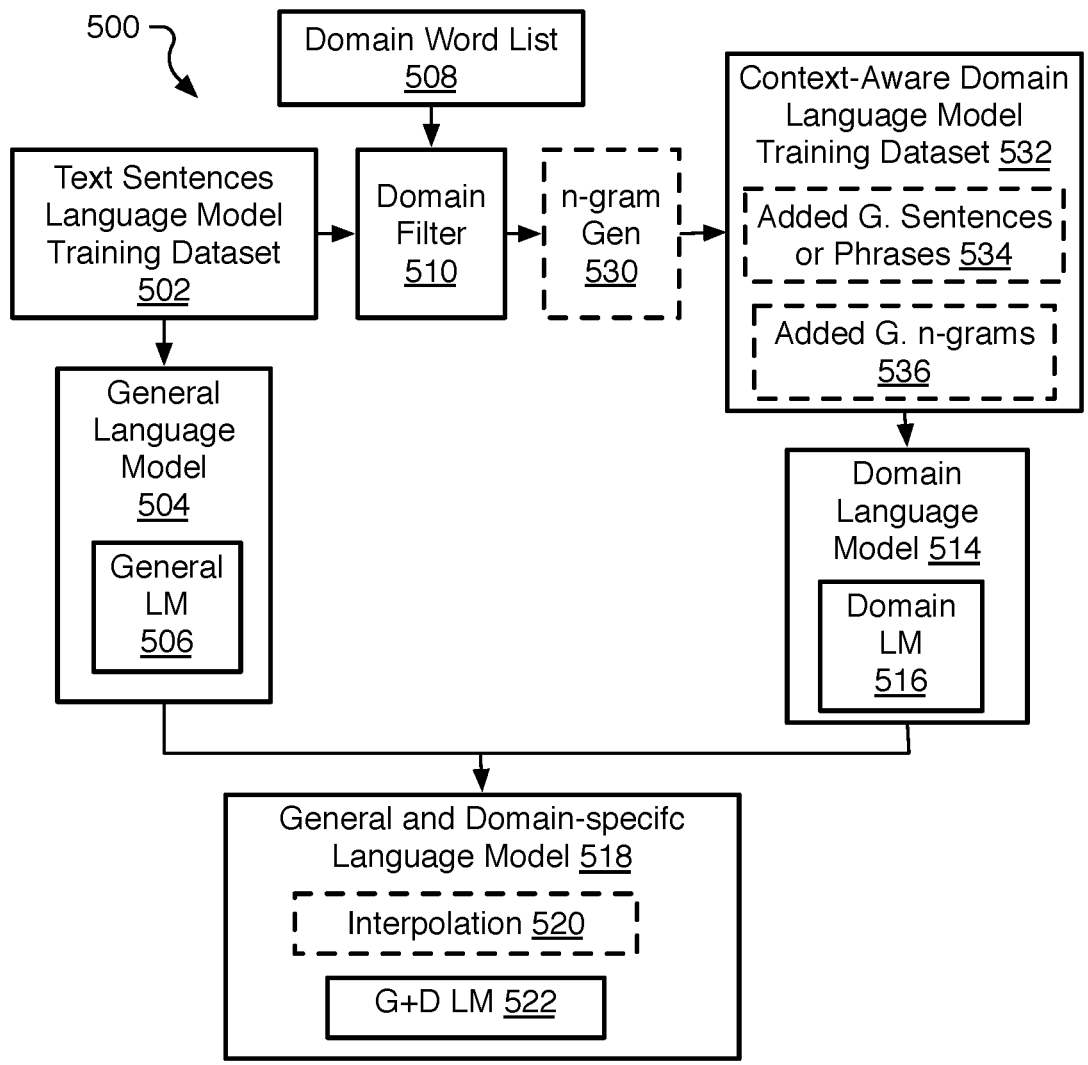
FIG. 5 is a schematic diagram showing an audio processing system for training an automatic context-aware domain-specific speech recognition language model according to at least one of the implementations herein.

Referring to FIG. 5, an audio processing system or device 500 is provided to train a general and domain-specific language model as described herein. The system 500 may have a text sentences language model training dataset (or general dataset) 502, a general language model unit 504 that uses the general dataset 502 to train a general language model 506. Also, a domain word list 508 is obtained or provided to a domain filter unit 510 that selects general sentences or general phrases in the general dataset 502 that have a domain word or phrase from the domain list 508. By one option, an n-gram generator unit 530 generates multiple n-grams for individual domain words or phrases in the selected general sentences and/or phrases.

Figure 6:
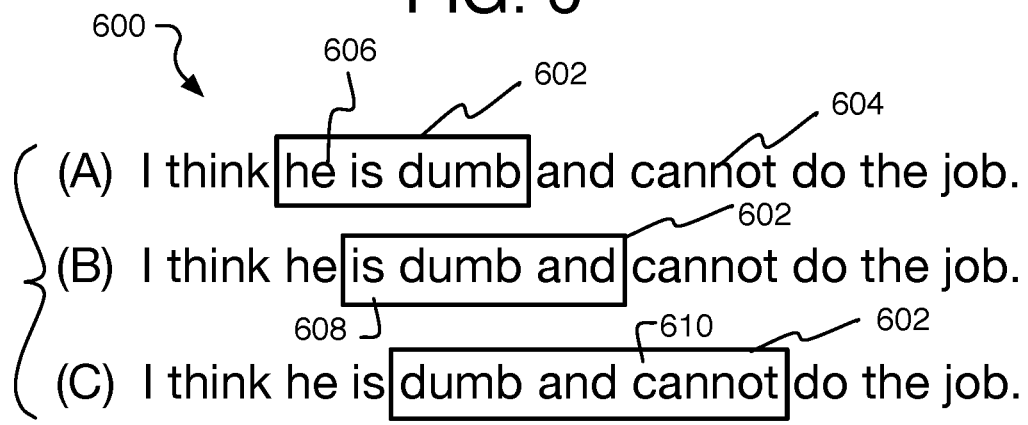
FIG. 6 is a diagram showing context-bound domain-specific training n-grams for a context-bound domain-specific language model training dataset according to at least one of the implementations herein.

Referring to FIG. 6 for example, a diagram 600 shows an n-gram sliding window 602 on an example general language model sentence 604 from the general language model dataset. The sentence is repeated three times (A-C) to show the changing position of the n-gram window 602. The n-gram window 602 may be fixed to have a length of three words and is shown enclosing a three word sequence as an n-gram 606 including the example possible toxic domain word "dumb". The window 602 is moved to capture the domain word at each position in the n-gram window 602, which in turn, provides three n-grams 606, 608, and 610 each with a different position of the domain word within the n-grams 606, 608, and 610 and to add the n-grams 606, 608, and 610 to the domain dataset. This may be repeated for each domain word or domain phrase found for any domain that is being targeted.

Thereafter either the domain filter adds the general sentences and/or phrases 534 directly to a context-aware domain language model training dataset (or domain dataset) 532 or the n-gram generator unit 530 adds the general-based n-grams 536 to the domain dataset 532 or both may be performed. A domain language model unit 514 then trains a domain language model 516 with the domain dataset.

A general and domain-specific language model unit 518 then combines the two trained general and domain language models 506 and 516, such as by language model interpolation performed by an interpolation unit 520, and to form a general and domain-specific language model 522 that can be used for accurate domain language detection during continuous automatic speech recognition. Some details are provided below in processes 700 and 800 for the operation of audio processing or model training system 500.

Figure 7:
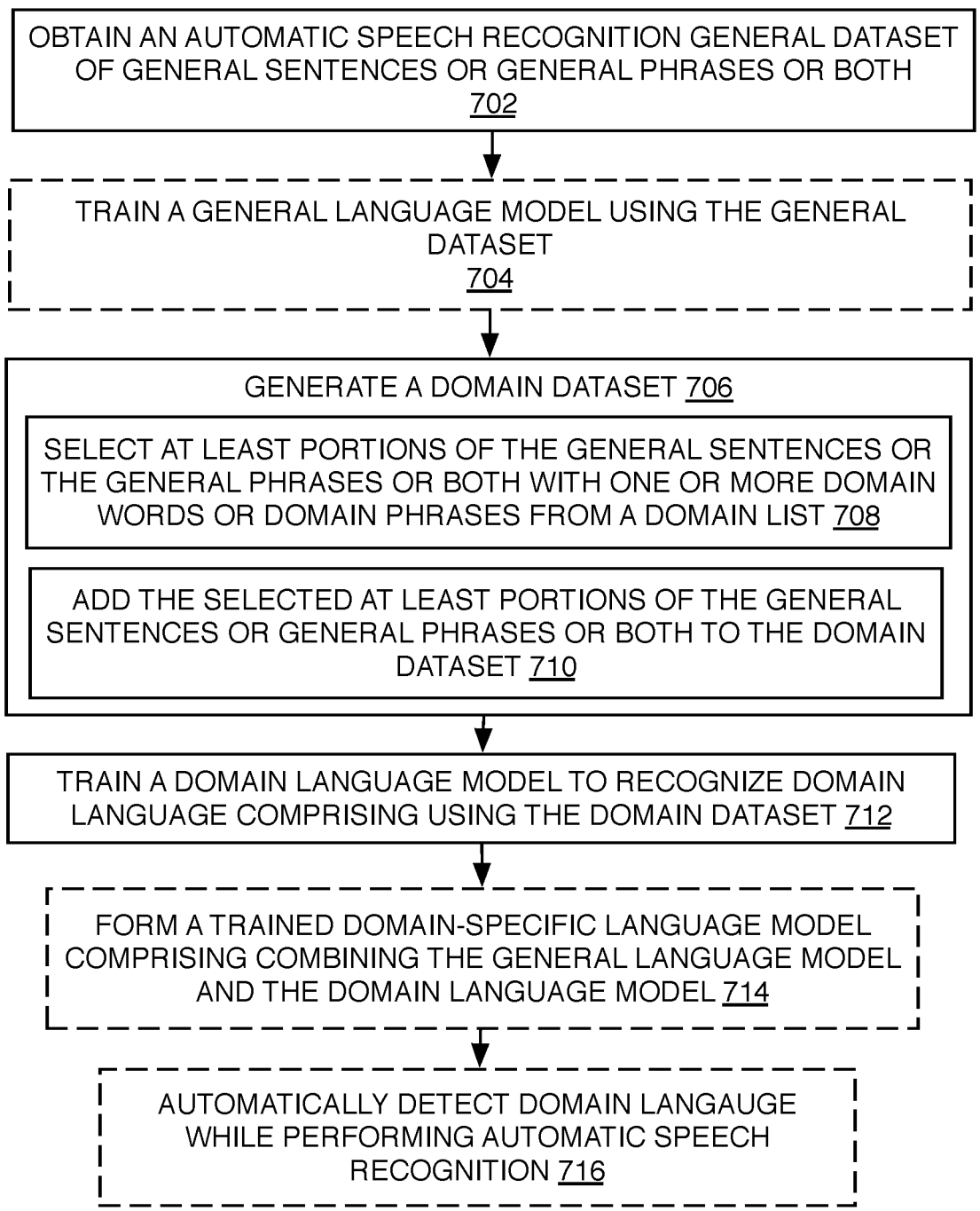
FIG. 7 is a flow chart of a method of audio processing for automatic context-bound domain-specific speech recognition according to at least one of the implementations herein.

Referring to FIG. 7, an example process 700 for a computer-implemented method of context-aware domain-specific speech recognition is provided. In the illustrated implementation, process 700 may include one or more operations, functions or actions as illustrated by one or more of operations 702 to 716 numbered evenly. By way of non-limiting example, process 700 may be described herein with reference to example speech recognition devices or systems described herein with any of FIGS. 3-6 and 9, where relevant.

Process 700 may include "obtain an automatic speech recognition general dataset of general sentences or general phrases or both" 702, which refers to a general or generic language model dataset such as for ASR continuous monitoring such as that used for a personal assistant application (e.g., Apple's "Ski" or Amazon's "Alexa"), for example. At this point, there may not be any bias for any specific domain in the general dataset although there could be, such as for specific industry or specific application uses or targets. By one alternative, the general language model could be biased for a particular domain (such as an industry or particular market or sector such as "customers") and that is a different domain then the domain of the domain dataset being generated and trained herein. This may be desired when detecting false negatives is more important than detecting false positives.

Process 700 may include "train a general language model using the general dataset" 704. This is provided for when the trained general language model is to be combined with the domain model as described below. The general language models are trained with known techniques.

Process 700 may include "generate a domain dataset" 706. This operation may include "select at least portions of the general sentences or the general phrases or both with one or more domain words or domain phrases from a domain list" 708. Specifically, this involves first filtering the general sentences and general phrases in the general dataset to find domain words or domain phrases that match those on a domain word list. By one form, the domain word list may include single words and two word phrases. By one approach, the selection stops when the method finds full general sentences and full general phrases with the domain language from the domain list to be added to the domain dataset.

By another approach, once a domain word or phrase is found in a general sentence or general phrase, context n-grams with the domain language from the general sentence or general phrase are generated and extracted to add just the context n-grams to the domain dataset rather than the full general sentences or full general phrases. Particularly, this may involve generating multiple context n-grams each with at least one domain word in the general sentence or general phrase. By one approach, each found domain word or phrase has multiple context n-grams where each of these n-grams include a same domain word from a same or single position in a single general sentence or single general phrase. By one form, the position of the same domain word varies within each context n-gram of the same domain word in the same general sentence or general phrase. The system may use a sliding window on the general sentence or phrase with the domain word to generate the multiple n-grams of a same domain word or domain phrase (as shown on FIG. 6). This is repeated for each instance of a domain word or domain phrase in the general sentences or general phrases.

In this approach, the total number of words in the window may be fixed, such as three words, although the window size could vary instead of slide at each same domain word or domain phrase (such as from 1 to 3 words or 3 to 5 words, for example). Otherwise, the two techniques (fixed window and varying window) could both be used, either alternatively on the same general dataset depending on certain factors (such as swear word versus toxic phrase) or together.

This operation then may include "add the selected at least portions of the general sentences or general phrases or both to the domain dataset" 710. The domain dataset may initially include the domain list of domain words and short phrases although other variations are possible. By one approach, as mentioned, the n-gram generation is omitted and the selected full general sentences and/or general phrases are added to the domain dataset instead. By another approach, when n-grams are generated, the n-grams are added to the domain dataset without adding the selected full general sentences and full general phrases. By yet another approach, both the selected full general sentences and phrases as well as the n-grams are added to the domain dataset.

Process 700 may include "train a domain language model to recognize domain language comprising using the domain dataset" 712. Here the domain language model is trained with the domain dataset with the added selected sentences, phrases, and/or context n-grams. By one approach, the process 700 could stop here and the trained domain language model could be used during run-time for domain language detection. However, it has been found that the resulting language model is much more accurate when the trained domain language model is combined with the trained general language model as follows.

Accordingly, process 700 may include "form a trained domain-specific language model comprising combining the general language model and the domain language model" 714, and by one form using language model interpolation. Such interpolation processes are much more than simply adding words of one dataset to the words of the other dataset and often may include combining the probabilities of the same word or phrase found in both datasets, as explained below. The resulting combined language model may be referred to as a general and domain-specific language model.

Process 700 may include "automatically detect domain language while performing automatic speech recognition" 716, and herein the general and domain-specific language model is used during a run-time to detect the domain language while also having the ability to perform routine continuous general ASR.

Figure 8:
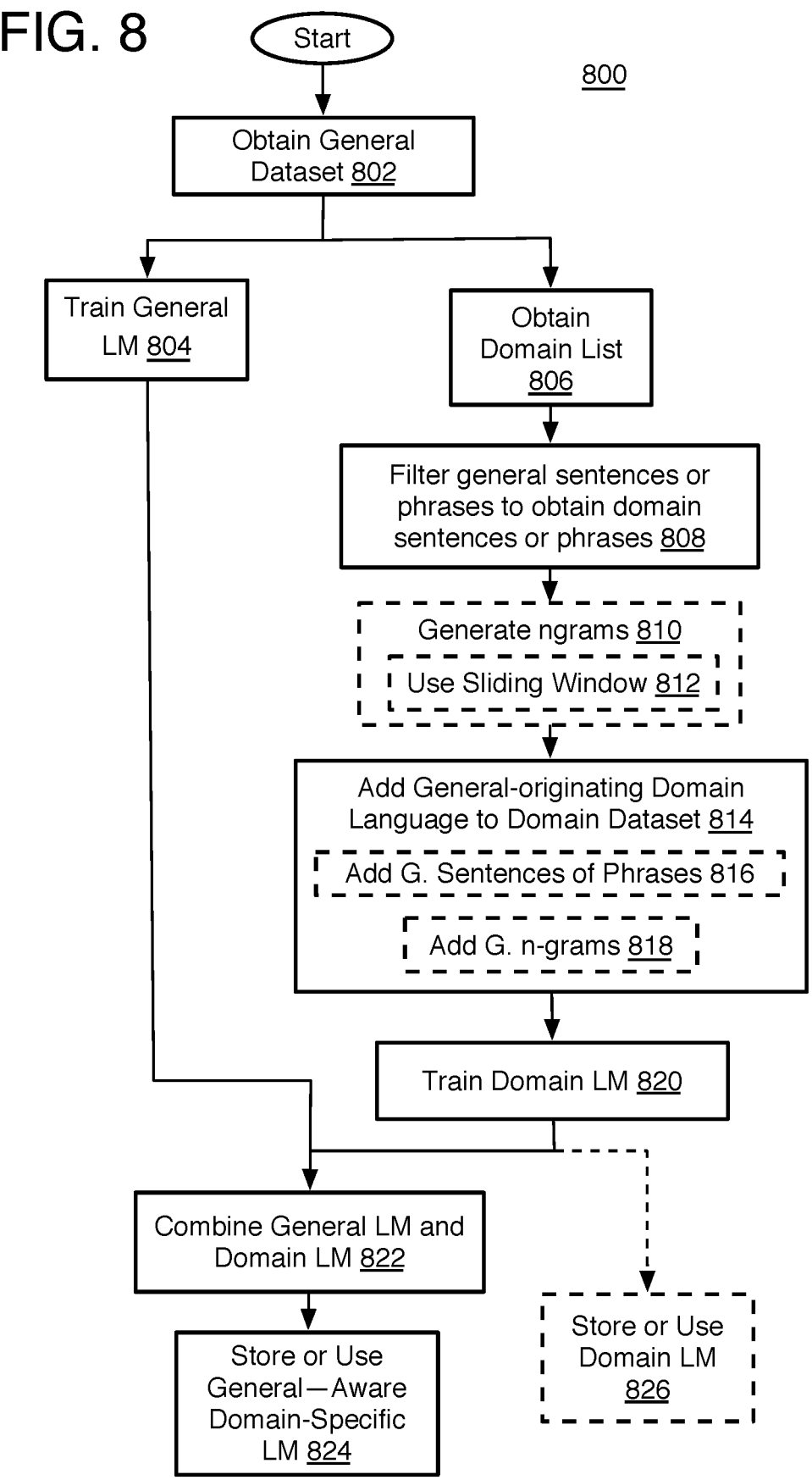
FIG. 8 is a detailed flow chart of audio processing for automatic context-bound domain-specific speech recognition according to at least one of the implementations herein.

Referring to FIG. 8, an example process 800 for a computer-implemented method of automatic context-aware domain-specific speech recognition is provided. In the illustrated implementation, process 800 may include one or more operations, functions or actions as illustrated by one or more of operations 802 to 826 numbered evenly. By way of non-limiting example, process 800 may be described herein with reference to example speech recognition devices or systems described herein with any of FIGS. 3-5 and 9, where relevant.

Process 800 may include "obtain general dataset" 802. A generic or general language model may have a large amount of generic data to train the first or general (or generic) language model. This may include full general sentences and full general phrases from one or more of a large variety of different publicly available language databases or may be a customized general language model database. The examples herein used a database consisting of a mix of newspaper, broadcast, book and other language content from various sources. The general dataset should at least be known to have an acceptable frequency of the target domain language being used for the present method. Also, the general dataset may have at least one million words in one language.

Process 800 may include "train general LM" 804, where the general database may be trained by well-known techniques such as n-gram counting. See for example, www.cs.cmu.edu/afs/cs/project/cmt-55/lti/Courses/731/homework/HW8/srilm/man/html/ngram-count.1.html)

Process 800 may include "obtain domain list" 806, including a predetermined domain list of words or phrases. In the case of a toxic language domain, the domain list may include words or phrases that are considered inappropriate, insulting, hurtful, and so forth. When the domain is toxic language, this may include swear words but also may be other words and phrases that are insulting, hurtful, in appropriate, and so forth, depending on the context, environment when spoken (such as online gaming), and how it was spoken (the tone, inflection, or emotion in the person's voice). Depending on how and where a word is spoken, it could be a compliment rather than an insult, for example. The domain word list may be provided in whatever language or languages to be monitored. Referring to FIG. 5, the domain list 508 may include single words (1-grams) or two word phrases (2-grams), but other alternatives could be used as well.

Process 800 may include "filter general sentences or phrases to obtain domain sentences or phrases" 808, and this may be performed by the domain filter unit 510. Here, the domain list 508 is used as the target list to find domain words and phrases in the general data (general sentences and general phrases of the general dataset). This involves looping through the available general dataset and selecting all of the general sentences or general phrases that have a domain word or phrase from the domain list. By one form, the system searches only for the exact domain words or domain phrases and ignores any other context at this point. The general sentences or general phrases are then selected and marked (and/or extracted) for addition to the domain dataset.

By one approach, the selection of general data to add to the domain dataset ends here, and the selected general sentences and general phrases with the domain language will be added to the domain dataset. This operation provides the domain language model benefits over the conventional methods because it provides the statistical information of the frequencies of the domain words and their context. These models perform significantly better in the target domains than models created using the conventional methods.

The domain language model using the full general sentences and full general phrases with domain language, however, still may be trained on relatively limited amounts of examples. Specifically, and usually, the general datasets do not have enough sentences with toxic words to build a highly accurate domain dataset. In consequence, the resulting language model may be biased not only towards the domain words, but also towards all the words and phrases (n-grams) occurring in the general sentences in the domain dataset being used to train the domain language model. Since the large amount of all possible word sequences that would be equally probable is not represented in the smaller training subset (the general sentences and phrases added to the domain dataset), this may raise model perplexity, thus possibly confusing the decoder.

Thus, process 800 may include "generate n-grams" 810, and this may be operated by n-gram generator unit 530. Here, sequences of words (or context n-grams) are obtained from the selected general sentences and general phrases that have domain words or phrases so that the domain word or phrase is within the n-gram. Multiple n-grams are generated for each single instance of a domain word. By using multiple n-grams with a single domain word instead of full general sentences, this better ensures that domain words are represented with their frequencies and are bound to their neighboring context without introducing the undesirable bias towards phrases occurring far in the sentences from the domain words.

To generate and extract the n-grams as mentioned, this may include "use sliding window" 812, and as explained with FIG. 6 above. The sliding window 602 may usually be a fixed length, such as three words, although a varying window size could be used instead or in addition as long as the same domain word or domain phrase is in each of the n-grams for that same domain word or domain phrase. By one alternative, whether the window is fixed or varies may depend on other factors such as a length of potential domain phrase when multiple domain phrases are found in series in a general sentence. In this case, at least some variations with a longer window may be helpful.

The n-gram generator 530 generates and extracts the n-grams and controls the left and right context length with the sliding window by sliding over 5-word (or other length such as 3-word) sequences of five or three words respectively, and creating n-grams out of them. By one form, the window size may be clipped when accounting for a sentence boundary (or beginning or end).

Process 800 may include "add general-originating domain language to domain dataset" 814, and also as mentioned, this may include "add general sentences or phrases" 816, where the selected general sentences and phrases with domain language are placed in the domain dataset instead of the n-grams. Alternatively, this operation 814 may include "add General n-grams" 818, referring to the context n-grams or just n-grams being added to the domain dataset instead of the full general sentences or full general phrases. By yet another alternative, both the n-grams and selected full general sentences and general full phrases are added to the domain dataset.

By one approach, the domain list (e.g. list 508 of toxic words and phrases) also provides the initial corpus for the domain dataset before any general data is added to the domain dataset. By an alternative approach, the domain list is only used for the filtering, and only the selected general data with domain words and phrases forms the domain dataset. Here, the general data could be the n-grams or the full general sentences or general phrases, or both.

Process 800 next may include "train domain LM" 820, to train the domain language model with the domain dataset. The training of the domain language model may be unsupervised training and may include n-gram counting techniques as mentioned above.

Process 800 may include "combine general LM and domain LM" 822. By the approach herein, the method uses n-gram language model interpolation. This may involve linear interpolation. The interpolation weights may be set to one, which results in summing the probability of each of the same n-grams (e.g., the same words in the same phrase or sub-phrase) from both models. The weight is used as a scaling factor for merging together the linear probabilities. The target order of the n-grams is three (maximum n-gram of 3) which can be represented as $$P(Wi | Wi-1, Wi-2)) \qquad (1)$$

where P is the linear probability that the last of the three words is present given the other two previous words. W is weight, and i is word count in the n-garm.

The generic language model is then interpolated with the language model trained on context-bound sequences containing toxic words. When interpolating the n-gram-based domain model, this is advantageous over the method adopting the full general sentences and general phrases, as mentioned above, because it reduces bias introduced when interpolating with these domain language models.

By one option. it should be noted that the trained n-gram-context-aware domain model, without interpolation with the whole general model, could be used on its own, although the domain model then may be limited because it would have many possible undescribed n-grams. In other words, the domain model then would be missing the language information to account for many acoustic observations that the ASR will make, often in the form of larger context chains of the full sentences and good false positive training from the general model interpolation. In this case, additionally interpolating the domain model with a 1-gram language model to smooth out missing context may help.

Otherwise, estimated parameters could be used when parameters are unknown when using the n-gram-context-aware domain model without the interpolation with the general model. In this technique, a symbol labeled unknown is used when information is missing on the Markov models to force a Viterbi search to at least operate, although the symbol still is just an approximation of missing context from the training.

Process 800 then may include "store or use general-aware domain specific-LM" 824, and a similar operation 826 is provided when the domain model is being used alone. In this case, the models may be used immediately for run-time use, or may be stored for later run-time use or transmission to a remote device for run-time use. The resulting general and domain-specific language model 522 may be used for continuous ASR. In such a case, anything spoken by a person may be analyzed and words recognized to determine if further actions are needed.

It also will be appreciated that the model training methods and systems disclosed herein can be used for other domains rather than just the toxic language domain. Specifically, the training may be used for government audio surveillance for illegal activity, for example, searching telephone or social website videos for words such as "terrorist" or "bomb" for example. Otherwise, retailers and businesses with buildings visited by customers may perform audio monitoring in their stores or business to gauge client interests, which may be used to determine particular locations for items being sold or display of marketing materials to increase sales. This may be performed with very large databases of phrases regarding a specific topic, and could be used to improve overall WER in specific settings since the present methods factor context into the domain language model.

The present methods also could be used by dispensing machines used in public such as automatic teller machines (ATMs), food vending machines, or ticket dispensing machines to name a few examples, and where reducing the amount of physical contact on a touch screen is important to reduce germ transmission from person to person. In these cases, ASR systems in loud public environments usually have difficulty with accuracy. Also, people using these machines may not know the exact key words needed when small vocabulary ASR key word systems are being used, or the volume needed to speak the key words near the dispensing machine. The present methods avoid or reduce these problems and eliminates the need to teach how to use the dispensing machine's audio recognition since the present methods have the ability to extract key words from general language including spoken whole sentences, thereby improving the accuracy of a public ASR.

Also, the present method and system is an embedded single ASR system that may reduce memory capacity requirements. When a user wishes to use both key-word commands (to dim lights for example) and to transcribe a meeting in a conference room for example, only the disclosed single interpolated language model with a single domain may be needed. Otherwise in this situation, the conventional technology will require two language models: the ASR model and a separate wake-on-voice model, and in turn a larger memory capacity. Thus, the present method allows for a combined single model without deteriorating WER and while providing high accuracy.

Experimental Results

Below are results of evaluation of the disclosed method, system, and language models using ASR systems based on a HMM-LSTM chain Kaldi system together with previous state-of-the-art language models (denoted as methods or systems of FIGS. 1 and 2) and the disclosed methods (denoted as methods or systems of FIG. 5(full) or FIG. 5(ngram)). The evaluation procedure for the experiments used score lattices from the acoustic model and used WFST decoding with weights supplied by the language models, which performs fast online decoding in ASR systems. The acoustic model, like the chain model itself, was no different from a conventional DNN-HMM used with a (currently) 3-fold reduced frame rate at the output of the DNN. The input features of the DNN were at an original frame rate of 100 frames per second. The DNNs used may have recurrent connections or internal splicing such that the DNNs were not purely feedforward DNNs. Table 1 shows that experiments with this language model achieve very high toxic word recall performance with very low recognition latency.

TABLE 1

Experimental Results

| Experiment Name | Method | WER [%] 1) discord 2) i139 3) librispeech | Recall (%) | LAT90 (ms) |
|---|---|---|---|---|
| V26 baseline | FIG. 1 | 1) 46.66 2) 11.2 3) 7.5 | 63.4% | 604 |
| V3 toxic phrases 1:0.1 | FIG. 2 | 1) 46.65 2) 11.2 3) 7.4 | 62.0% | 587 |
| V4 toxic phrases 1:0.3 | FIG. 2 | 1) 47.07 2) 11.3 3) 7.4 | 60.2% | 534 |
| V7 sentences 1:0.3 | FIG. 5 (full) | 1) 46.45 2) 11.3 3) 7.4 | 77.4% | 455 |
| V9 sentences 1:1 | FIG. 5 (full) | 1) 46.68 2) 11.6 3) 7.5 | 80.5% | 416 |
| V6 context window 1:0.3 | FIG. 5 (ngram) | 1) 46.60 2) 11.4 3) 7.5 | 79.3% | 400 |
| V8 context window 1:1 | FIG. 5 (ngram) | 1) 47.84 2) 11.8 3) 7.7 | 82.3% | 389 |

In Table 1, Experiment Name indicates the type of method uses. The conventional baseline method is a conventional ASR as in FIG. 1, the conventional toxic phrases method uses a domain-specific dataset, such as a domain list, as in FIG. 2, the sentences method, is one of the disclosed method that adopts general sentences with domain words, as described with the system of FIG. 5(full), and the context window method refers to the disclosed system in FIG. 5(ngram) that uses n-gram context windows to find additions for the domain dataset. The ratio after the experiment name refers to the interpolation ratio. The left number refers to the interpolation weight of the general language model and the right number refers to the interpolation weight of the domain language model. For example 1:0.3 means that the domain language model has all probabilities reduced by 3.3(3) times.

A word error rate (WER) metric measures three different datasets: (1) discord which is a customized proprietary dataset collected from gaming channels, (2) i139 which is a commercial dataset from SpeechOcean, and (3) librispeech which is a publicly available dataset consisting of recordings of book readings. The WER can be computed as:

$$WER = \frac{S+D+I}{N} = \frac{S+D+I}{S+D+C} \quad (2)$$

where S is the number of substitutions, D is the number of deletions, I is the number of insertions, C is the number of correct words, and N is the number of words in the reference (N=S+D+C).

Recall refers to a ratio of positive detections of selected phrases to all selected phrases in a dataset. The dataset used for recall in the experiment here is a subset of the discord dataset. LAT90 is a measure of required buffer capacity, or in other words, how long (or large) the audio buffer needs to be in order to transcribe 90% of words. This measure is used to balance quality versus latency in online systems when setting up an audio buffer size.

Experiments show that the present method and system significantly improves LAT90 of the overall system with very marginal increase in WER. This translates to better user experience as the result of recognition can be consumed and interpreted faster. In the case of toxic word detection, if the desired outcome is that the given toxic word was "bleeped out", then more words can be recognized with shorter audio buffering, which will lead to less latency in communication between users. Additionally, higher recall was achieved than conventional systems, which in many use-cases is desirable such as with toxic word detection where more false positives are better than false negatives.

In addition, any one or more of the operations of the processes in FIGS. 7-8 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 9:
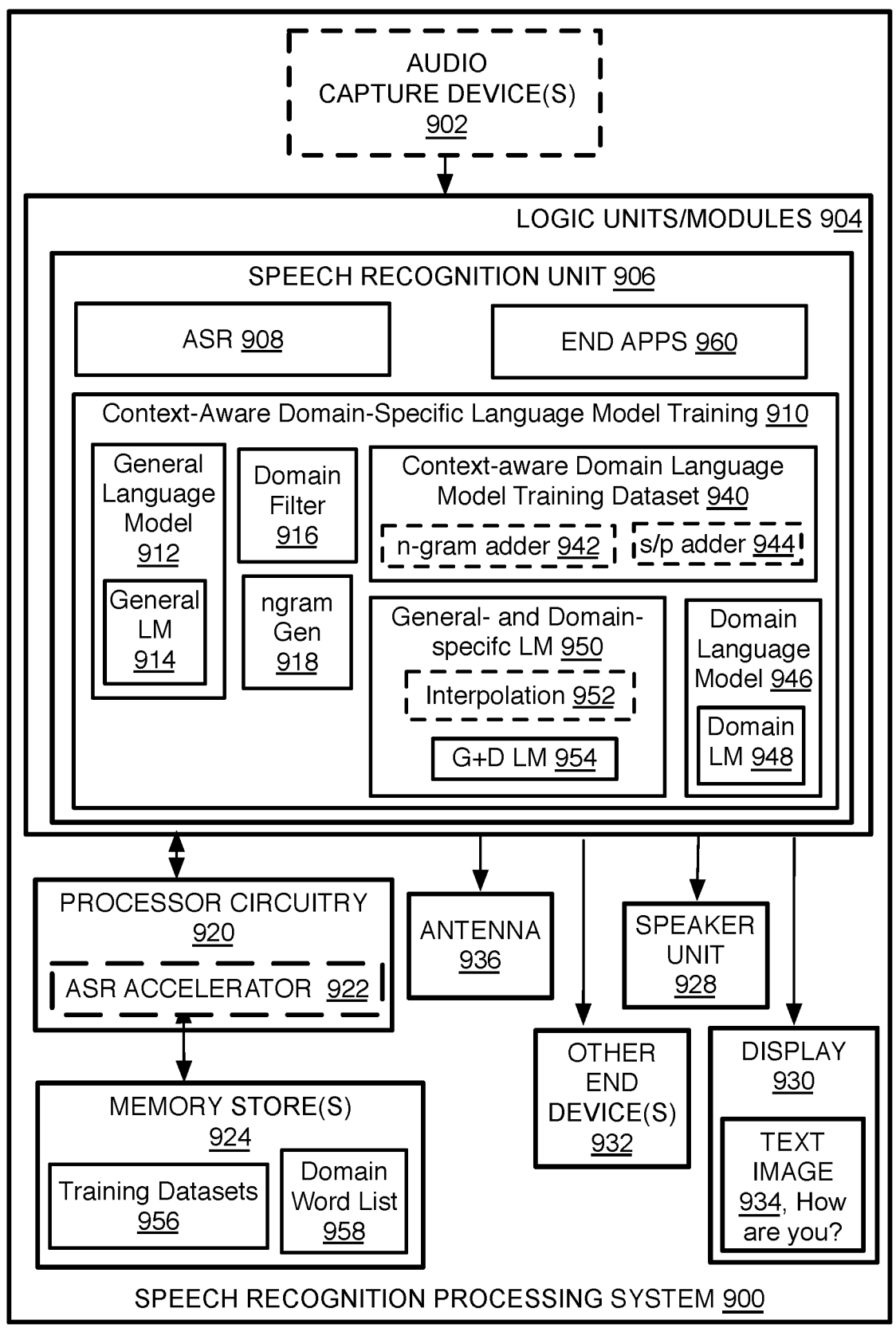
FIG. 9 is an illustrative diagram of an example system.

Referring to FIG. 9, an example audio processing system 900 is arranged in accordance with at least some implementations of the present disclosure. In various implementations, the example audio processing system 900 may have an audio capture device(s) 902 to form or receive acoustical signal data. This can be implemented in various ways. Thus, in one form, the system 900 may be an audio capture device such as a microphone, and audio capture device 902, in this case, may be the microphone hardware and sensor software, module, or other component. In other examples, the system 900 may have an audio capture device 902 that includes or may be a microphone, and logic modules 904 may communicate remotely with, or otherwise may be communicatively coupled to, the audio capture device 902 for further processing of the acoustic data.

In either case, such technology may include a telephone, a smart phone, a dictation machine, other sound recording machine, a mobile device or an on-board device, or any combination of these, or any device or machine or computer with one or more microphones. Thus, in one form, audio capture device 902 may include audio capture hardware including one or more sensors as well as actuator controls. These controls may be part of a sensor module or component for operating the sensor. The sensor component may be part of the audio capture device 902, or may be part of the logical modules 904 or both. Such sensor component can be used to convert sound waves into an electrical acoustic signal. The audio capture device 902 also may have an A/D converter, other filters, and so forth to provide a digital signal for speech recognition processing.

In the illustrated example, the logic modules 904 may be local or remote from the microphones 902. In either this case, the system 900 or logical modules 904 may be on any computing device, whether a remote or local server, desktop, laptop, tablet, or smartphone, any computer peripheral device such as printers, televisions, set top boxes, game consoles, and so forth, any internet-of-things (IoT) device, vending or dispensing machine, banking machine, or any machine that interacts with a user.

The logic modules 904 may include a speech recognition unit 906 with an ASR unit 908 that has those components of an ASR system, such as system 300 (FIG. 3) with language model 400 (FIG. 4), to perform ASR during a run-time and as described above. The logic units 904 also may have a context-aware domain-specific language model training unit 910 to train language modes according to the methods described herein, and to train a general-aware domain specific language model 950, similar to language model 400.

The training unit 910 may have a general language model unit 912 with a general language model 914, a domain filer unit 916, an n-gram generation unit 918, a context-aware domain language model training dataset unit 940 with an n-gram adder unit 942 and/or a general sentence or phrase adder unit 944. The training unit 910 also may have a domain language model unit 946 that operates a domain language model 948, and a general and context-aware domain-specific language model unit 950 that operates an interpolation or other model combining unit 952 and a general and context-aware domain-specific language model 954. Any of the datasets 956 and the original domain word list 958 may be stored in memory 924. The logic units 904 also may include end apps 960, which may or may not be part of the speech recognition unit 906. The end apps or devices may receive ASR and domain detection decisions, and initiate responses to the recognized speech as described above. All of these units are similar to units mentioned above in systems 300, 400, and/or 500, and may perform similar tasks as indicated by the label of the unit.

The system 900 may have processor circuitry 920 forming one or more processors which may include one or more CPUs and/or a dedicated accelerator 922 such as the Intel Atom and/or other GPUs, the memory stores 924 which may hold the training data mentioned as well as any run-time data needed for the ASR-related operations. In one example implementation, the audio processing system 900 may have the display 934, processor circuitry 920 forming at least one processor communicatively coupled to the display, memory 924 communicatively coupled to the processor. The antenna 936 may be provided for transmission of the best word sequence matched to the input acoustic signal, domain language identification, or other relevant commands to other devices that may act upon such determinations. Otherwise, the results of the speech recognition process may be stored in memory 924.

As illustrated, any of these components may be capable of communication with one another and/or communication with portions of logic modules 904 and/or audio capture device 902. Thus, processors formed by processor circuitry 920 may be communicatively coupled to both the audio capture device 902 and the logic modules 904 for operating those components. By one approach, although audio processing system 900, as shown in FIG. 9, may include one particular set of blocks or actions associated with particular components or modules, these blocks or actions could be associated with different components or modules than the particular component or module illustrated here.

Figure 10:
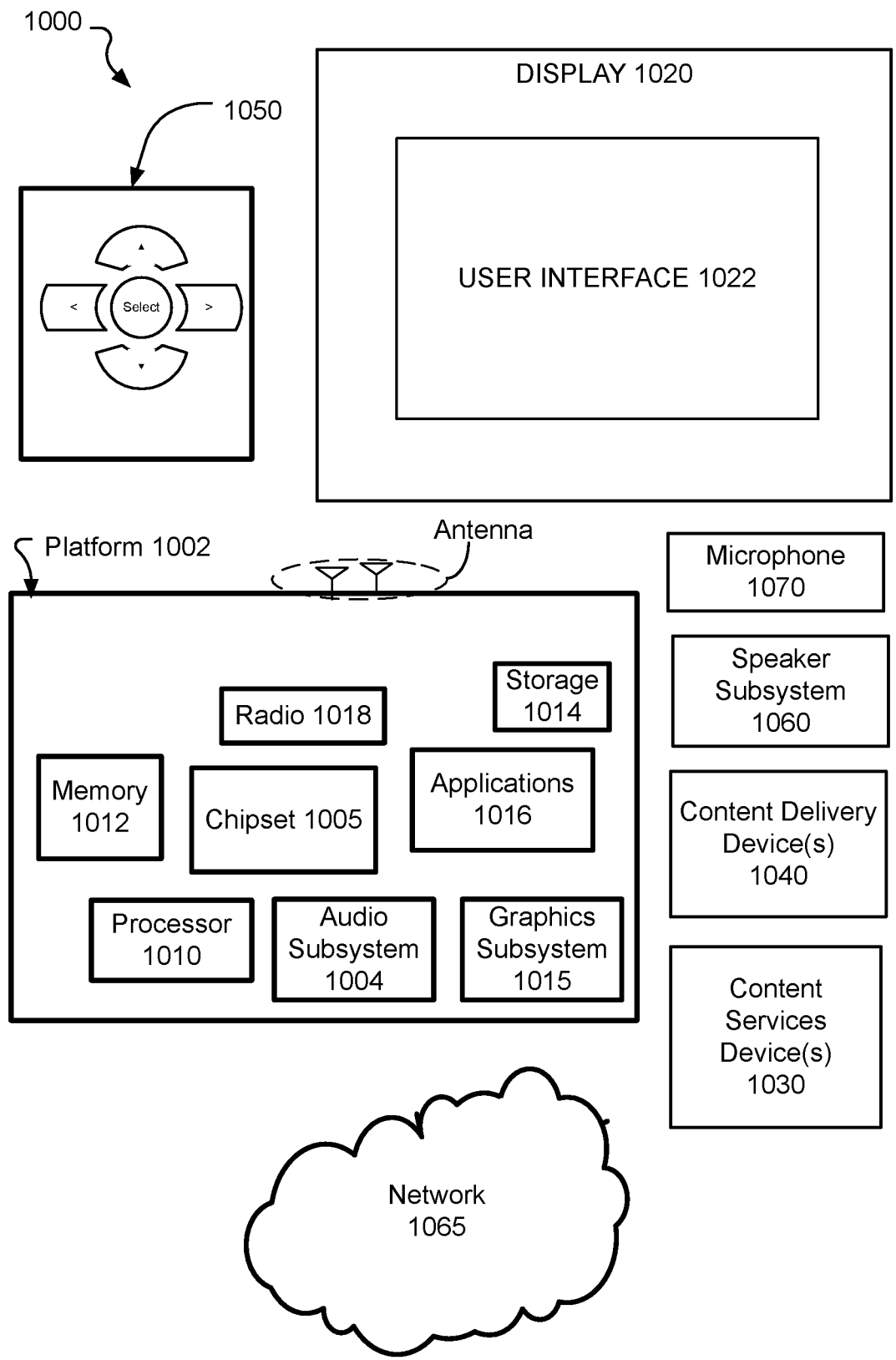
FIG. 10 is an illustrative diagram of another example system.

Referring to FIG. 10, an example system 1000 in accordance with the present disclosure operates one or more aspects of the audio processing system described herein. It will be understood from the nature of the system components described below that such components may be associated with, or used to operate, certain part or parts of the audio processing system described above. In various implementations, system 1000 may be a media system although system 1000 is not limited to this context. For example, system 1000 may be incorporated into a microphone, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002, speaker subsystem 1060, microphone 1070, and/or display 1020. Each of these components is described in greater detail below.

In various implementations, platform 1002 may include any combination of a chipset 1005, processor 1010, memory 1012, storage 1014, audio subsystem 1004, graphics subsystem 1015, applications 1016 and/or radio 1018. Chipset 1005 may provide intercommunication among processor 1010, memory 1012, storage 1014, audio subsystem 1004, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Audio subsystem 1004 may perform processing of audio such as acoustic signals for speech recognition and domain detection as described herein and/or voice recognition. The audio subsystem 1004 may comprise one or more processing units and accelerators. Such an audio subsystem may be integrated into processor 1010 or chipset 1005. In some implementations, the audio subsystem 1004 may be a standalone card communicatively coupled to chipset 1005. An interface may be used to communicatively couple the audio subsystem 1004 to a speaker 1060, microphone 1070, and/or display 1020. Alternatively, a discrete audio processor may be used. As still another implementation, the audio functions may be provided by a general purpose processor, including a multi-core processor. In further implementations, the functions may be implemented in a consumer electronics device.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, screen on any device such as an IoT deice, HMD, smart eyewear, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020, speaker 1060, and microphone 1070. Platform 1002 and/or content services device(s) 1030 may be coupled to a network 1065 to communicate (e.g., send and/or receive) media information to and from network 1065. Content delivery device(s) 1040 also may be coupled to platform 1002, speaker 1060, microphone 1070, and/or to display 1020.

In various implementations, content services device(s) 1030 may include a microphone, a cable television box, personal computer, network, telephone, Internet enabled devices or appliance capable of delivering digital information and/or content, and any other similar device capable of unidirectionally or bidirectionally communicating content between content providers and platform 1002 and speaker subsystem 1060, microphone 1070, and/or display 1020, via network 1065 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1004 also may be used to control the motion of articles or selection of commands on the interface 1022.

Movements of the navigation features of controller 1050 may be replicated on a display (e.g., display 1020) by movements of a pointer, cursor, focus ring, or other visual indicators displayed on the display or by audio commands. For example, under the control of software applications 1016, the navigation features located on navigation controller 1050 may be mapped to virtual navigation features displayed on user interface 1022, for example. In embodiments, controller 1050 may not be a separate component but may be integrated into platform 1002, speaker subsystem 1260, microphone 1070, and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example, or by auditory command. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002, speaker 1060, microphone 1070, and/or display 1020 may be an integrated unit. Display 1020, speaker 1060, and/or microphone 1070 and content service device(s) 1030 may be integrated, or display 1020, speaker 1060, and/or microphone 1070 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
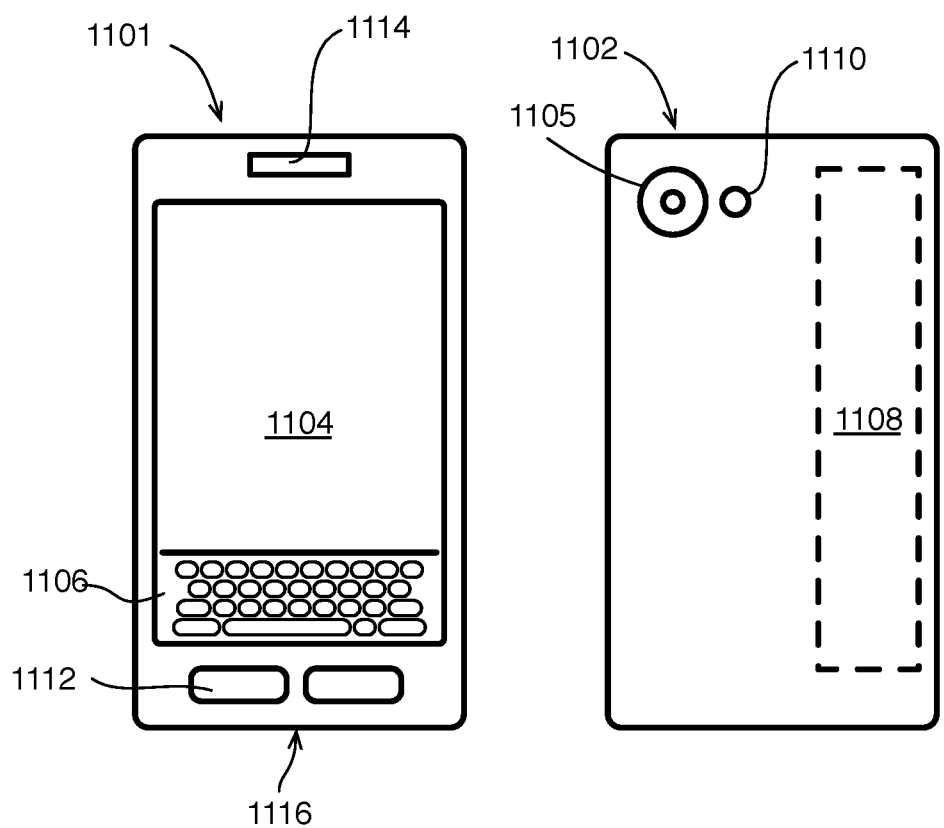
FIG. 11 illustrates another example device, all arranged in accordance with at least some implementations of the present disclosure.

Referring to FIG. 11, a small form factor device may be arranged in accordance with at least some implementations of the present disclosure. In some examples, system 900 or 1000 may be implemented via device 1100. In other examples, other devices or systems, or portions thereof may be implemented via device 1100. In various implementations, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112 and one or more microphones 1116 and one or more speakers 1114. I/O device 1106 may include any suitable I/O device for entering information into a mobile computing device. Examples for I/O device 1106 may include an alphanumeric keyboard, a numeric keypad, a touch pad, input keys, buttons, switches, audio analysis or voice recognition device and software as described herein, and so forth. Information may be entered into device 1100 by way of microphone 1116, or may be digitized by the methods and systems described herein. As shown, device 1100 also may include a camera 1105 (e.g., including a lens, an aperture, and an imaging sensor) and a flash 1110 integrated into back 1102 (or elsewhere) of device 1100.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), fixed function hardware, field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example one or more first implementations, a computer-implemented method of audio processing comprises obtaining an automatic speech recognition general dataset of general sentences or general phrases or both; generating a domain dataset comprising selecting at least portions of the general sentences or the general phrases or both with one or more domain words or domain phrases from a domain list, and adding the selected at least portions of the general sentences or the general phrases or both to the domain dataset; and training a domain language model arranged to recognize domain words, domain phrases, and at least portions of domain sentences comprising using the domain dataset.

By one or more second implementations, and further to the first implementation, wherein the domain is toxic language deemed to be undesired or inappropriate language in an environment present when audio is captured to be analyzed by the trained domain language model.

By one or more third implementations, and further to the first or second implementation, wherein the at least portions of the general sentences or general phrases to be added to the domain dataset are entire sentences or entire phrases from the general dataset.

By one or more fourth implementations, and further to any of the first to third implementation, wherein the method generating context n-grams to add to the domain dataset comprising selecting n-grams in the selected general sentences or general phrases with the domain words or domain phrases.

By one or more fifth implementations, and further to the fourth implementation, wherein the method comprising generating multiple context n-grams each with at least one domain word in the general sentence or general phrase, wherein the generating multiple context n-grams comprises using a sliding window on the general sentence or general phrase with the domain word.

By one or more sixth implementations, and further to the fourth implementation, wherein the generating context n-grams comprises selecting multiple context n-grams each of the multiple words including a same domain word from a single general sentence or single general phrase, wherein the position of the same domain word varies within each context n-gram of the same domain word in the same general sentence or general phrase.

By one or more seventh implementations, and further to any one of the fourth to sixth implementation, wherein the context n-gram size in total number of words remains fixed.

By one or more eighth implementations, and further to any of the fourth to seventh implementation, wherein the context n-grams are each three to five words.

By one or more ninth implementations, and further to any of the fourth implementation, wherein generating context n-grams comprises selecting multiple context n-grams each of multiple words including a same domain word from a same position in one of the general sentences or general phrases, wherein the number of words from the general sentence or general phrase in each context n-gram is different of the multiple context n-grams.

By one or more tenth implementations, and further to any of the first to ninth implementation, wherein the method comprising adding the context n-grams of the general sentences or general phrases to the domain dataset instead of adding the selected general sentence and general phrase to the domain dataset associated with the context n-grams.

By one or more eleventh implementations, and further to any of the first to tenth implementations, wherein the method comprising training the general language model; and forming a trained general and domain-specific language model comprising combining the general language model and the domain language model.

By an example one or more twelfth implementations, a computer-implemented system of automatic domain speech recognition comprises memory storing an audio signal of human speech; and processor circuitry forming at least one processor communicatively connected to the memory, the at least one processor being arranged to operate by: obtaining an automatic speech recognition general dataset of general sentences or general phrases or both; generating a domain dataset comprising selecting at least portions of the general sentences or the general phrases or both with one or more domain words or domain phrases from a domain list, and adding the selected at least portions of the general sentences or the general phrases or both to the domain dataset; and training a domain language model arranged to recognize domain words, domain phrases, and at least portions of domain sentences comprising using the domain dataset.

By one or more thirteenth implementation, and further to the twelfth implementation, wherein the at least portions of the general sentences or general phrases to be added to the domain dataset are entire sentences or entire phrases from the general dataset.

By one or more fourteenth implementations, and further to the twelfth or thirteenth implementation, wherein the at least one processor is arranged to operate by generating context n-grams to add to the domain dataset comprising selecting n-grams in the general sentences or general phrases with the domain words or domain phrases.

By one or more fifteenth implementations, and further to any of the fourteenth to fourteenth implementation, wherein the at least one processor is arranged to operate by generating multiple context n-grams each with at least one domain word in the general sentence or general phrase, wherein the generating comprises using a sliding window on the general sentence or general phrase with the domain word.

By one or more sixteenth implementations, and further to any of the fourteenth to fifteenth implementation, wherein the generating context n-grams comprises selecting multiple context n-grams each of the multiple words including a same domain word from a single general sentence or single general phrase, wherein the position of the same domain word varies within each context n-gram of the same domain word in the same general sentence or general phrase.

By one or more seventeenth implementations, and further to the sixteenth implementation, wherein the context n-gram size in total number of words remains fixed.

By one or more eighteenth implementations, and further to any of the twelfth to seventeenth implementation, wherein the at least one processor is arranged to operate by training the general language model; and forming a trained general and domain-specific language model comprising combining the general language model and the domain language model.

By an example one or more nineteenth implementations, at least one non-transitory computer-readable medium comprising a plurality of instructions that in response to being executed on a computing device, causes the computing device to operate by: obtaining an automatic speech recognition general dataset of general sentences or general phrases or both; generating a domain dataset comprising selecting at least portions of the general sentences or the general phrases or both with one or more domain words or domain phrases from a domain list, and adding the selected at least portions of the general sentences or the general phrases or both to the domain dataset; and training a domain language model arranged to recognize domain words, domain phrases, and at least portions of domain sentences comprising using the domain dataset.

By one or more twentieth implementations, and further to the nineteenth implementation, wherein the at least portions of the general sentences or general phrases to be added to the domain dataset are full sentences or full phrases from the general dataset.

By one or more twenty-first implementations, and further to the nineteenth or twentieth implementation, wherein the instructions cause the computing device to operate by generating context n-grams to add to the domain dataset comprising selecting n-grams in the selected general sentences or general phrases with the domain words or domain phrases.

By one or more twenty-second implementations, and further to the twenty-first implementation, wherein the generating context n-grams comprises selecting multiple context n-grams each of the multiple words including a same domain word from a same location of a single general sentence or single general phrase, wherein the position of the same domain word varies within each context n-gram of the same domain word at the same location in the same general sentence or general phrase.

By one or more twenty-third implementations, and further to any of the nineteenth to twenty-second implementation, wherein both a fixed window size and a varying window size are used to generate n-grams from the selected general sentences or general phrases to add the n-grams to the domain dataset.

By one or more twenty-fourth implementations, and further to any of the nineteenth to twenty-third implementation, wherein the instructions cause the computing device to operate by selecting and adding both (1) full general sentences and general phrases to the domain dataset, and (2) n-grams with the domain language from within the general sentences and general phrases to the domain dataset.

By one or more twenty-fifth implementations, and further to any of the nineteenth to twenty-fourth implementation, wherein the instructions cause the computing device to operate by training the general language model; and forming a trained domain-specific language model comprising combining the general language model and the domain language model.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of audio processing, comprising:
    obtaining an automatic speech recognition general dataset of general sentences or general phrases or both;
    generating a domain dataset comprising selecting at least portions of the general sentences or the general phrases or both with one or more domain phrases from a domain list, and adding the selected at least portions of the general sentences or the general phrases or both to the domain dataset;
    generating, by a processor, context n-grams to add to the domain dataset, including:
        selecting n-grams in the selected general sentences or general phrases with the domain phrases,
        selecting, for the domain dataset, multiple context n-grams wherein a position of the domain phrases varies within the general sentences or the general phrases or both,
        wherein generating the context n-grams includes using a sliding window having a selected length, and wherein the selected length of the sliding window can be one or more of a fixed length and a varying length, and
        based on a respective length of each of the domain phrases, determining whether the selected length of the sliding window is the fixed length or the varying length; and
    training a domain language model arranged to recognize the domain phrases, and at least portions of domain sentences comprising using the domain dataset.

2. The method of claim 1 wherein the domain is toxic language deemed to be undesired or inappropriate language in an environment present when audio is captured to be analyzed by the trained domain language model.

3. The method of claim 1 wherein the at least portions of the general sentences or general phrases to be added to the domain dataset are entire sentences or entire phrases from the general dataset.

4. The method of claim 1 wherein the generating context n-grams comprises selecting multiple context n-grams, each of the multiple context n-grams including a same domain word from a single general sentence or single general phrase, wherein the position of the same domain word varies within each context n-gram of the same domain word in the same general sentence or general phrase.

5. The method of claim 4 wherein the sliding window has a fixed length and the context n-gram size in total number of words remains fixed.

6. The method of claim 1 wherein the context n-grams are each three or five words.

7. The method of claim 1 wherein generating context n-grams comprises selecting multiple context n-grams each of multiple words including a same domain word from a same position in one of the general sentences or general phrases, wherein the number of words from the general sentence or general phrase in each context n-gram is different of the multiple context n-grams.

8. The method of claim 1 comprising adding the context n-grams of the general sentences or general phrases to the domain dataset instead of adding the selected general sentence and general phrase to the domain dataset associated with the context n-grams.

9. The method of claim 1 comprising training the general language model; and forming a trained general and domain-specific language model comprising combining the general language model and the domain language model.

10. The method of claim 1, wherein generating context n-grams to add to the domain dataset further comprises determining that the selected length of the sliding window is the varying length based on the respective length of a respective domain phrase of the domain phrases.

11. The method of claim 1, wherein generating context n-grams to add to the domain dataset further comprises determining that the selected length of the sliding window is the varying length based on determining that a plurality of domain words or of the domain phrases are present in series in a selected general sentence or general phrase.

12. A computer-implemented system of automatic domain speech recognition comprising:
    memory storing an audio signal of human speech; and
    processor circuitry forming at least one processor communicatively connected to the memory, the at least one processor being arranged to operate by:
        obtaining an automatic speech recognition general dataset of general sentences or general phrases or both;
        generating a domain dataset comprising selecting at least portions of the general sentences or the general phrases or both with one or more domain phrases from a domain list, and adding the selected at least portions of the general sentences or the general phrases or both to the domain dataset;
        generating context n-grams to add to the domain dataset, including:
            selecting n-grams in the selected general sentences or general phrases with the domain phrases,
            selecting, for the domain dataset, multiple context n-grams wherein a position of the domain phrases varies within the general sentences or the general phrases or both,
            wherein generating the context n-grams includes using a sliding window having a selected length, and wherein the selected length of the sliding window can be one or more of a fixed length and a varying length, and
            determining, based on a respective length of each of the domain phrases, whether the selected length of the sliding window is the fixed length or the varying length; and
        training a domain language model arranged to recognize the domain phrases, and at least portions of domain sentences comprising using the domain dataset.

13. The system of claim 12 wherein the at least portions of the general sentences or general phrases to be added to the domain dataset are entire sentences or entire phrases from the general dataset.

14. The system of claim 12 wherein the generating context n-grams comprises selecting multiple context n-grams each of the multiple context n-grams including a same domain word from a single general sentence or single general phrase, wherein the position of the same domain word varies within each context n-gram of the same domain word in the same general sentence or general phrase.

15. The system of claim 14 wherein the sliding window has a fixed length and the context n-gram size in total number of words remains fixed.

16. The system of claim 12 wherein the at least one processor is arranged to operate by training the general language model; and forming a trained general and domain-specific language model comprising combining the general language model and the domain language model.

17. The system of claim 12, wherein generating context n-grams to add to the domain dataset further comprises determining that the selected length of the sliding window is the varying length based on the respective length of a respective domain phrase of the domain phrases.

18. The system of claim 12, wherein generating context n-grams to add to the domain dataset further comprises determining that the selected length of the sliding window is the varying length based on determining that a plurality of domain words or of the domain phrases are present in series in a selected general sentence or general phrase.

19. At least one non-transitory computer readable medium comprising a plurality of instructions that in response to being executed on a computing device, causes the computing device to operate by:

obtaining an automatic speech recognition general dataset of general sentences or general phrases or both;

generating a domain dataset comprising selecting at least portions of the general sentences or the general phrases or both with one or more domain phrases from a domain list, and adding the selected at least portions of the general sentences or the general phrases or both to the domain dataset;

generating, by a processor, context n-grams to add to the domain dataset, including:
selecting n-grams in the selected general sentences or general phrases with the domain phrases,
selecting, for the domain dataset, multiple context n-grams wherein a position of the domain phrases varies within the general sentences or the general phrases or both, wherein generating the context n-grams includes using a sliding window having a selected length, and wherein the selected length of the sliding window can be one or more of a fixed length and a varying length, and based on a respective length of each of the domain phrases, determining whether the selected length of the sliding window is the fixed length or the varying length; and training a domain language model arranged to recognize the domain phrases, and at least portions of domain sentences comprising using the domain dataset.

20. The medium of claim 19 wherein the at least portions of the general sentences or general phrases to be added to the domain dataset are full sentences or full phrases from the general dataset.

21. The medium of claim 19 wherein the generating context n-grams comprises selecting multiple context n-grams each of the multiple context n-grams including a same domain word from a same location of a single general sentence or single general phrase, wherein the position of the same domain word varies within each context n-gram of the same domain word at the same location in the same general sentence or general phrase.

22. The medium of claim 19 wherein the instructions cause the computing device to operate by selecting and adding both (1) full general sentences and general phrases to the domain dataset, and (2) n-grams with the domain language from within the general sentences and general phrases to the domain dataset.

23. The medium of claim 19, wherein the instructions cause the computing device to operate by training the general language model; and forming a trained domain-specific language model comprising combining the general language model and the domain language model.

24. The medium of claim 19, wherein generating context n-grams to add to the domain dataset further comprises determining that the selected length of the sliding window is the varying length based on the respective length of the respective domain phrase of the domain phrases.

25. The medium of claim 19, wherein generating context n-grams to add to the domain dataset further comprises determining that the selected length of the sliding window is the varying length based on determining that a plurality of domain words or of the domain phrases are present in series in a selected general sentence or general phrase.

* * * * *